UNITED STATES PATENT OFFICE.

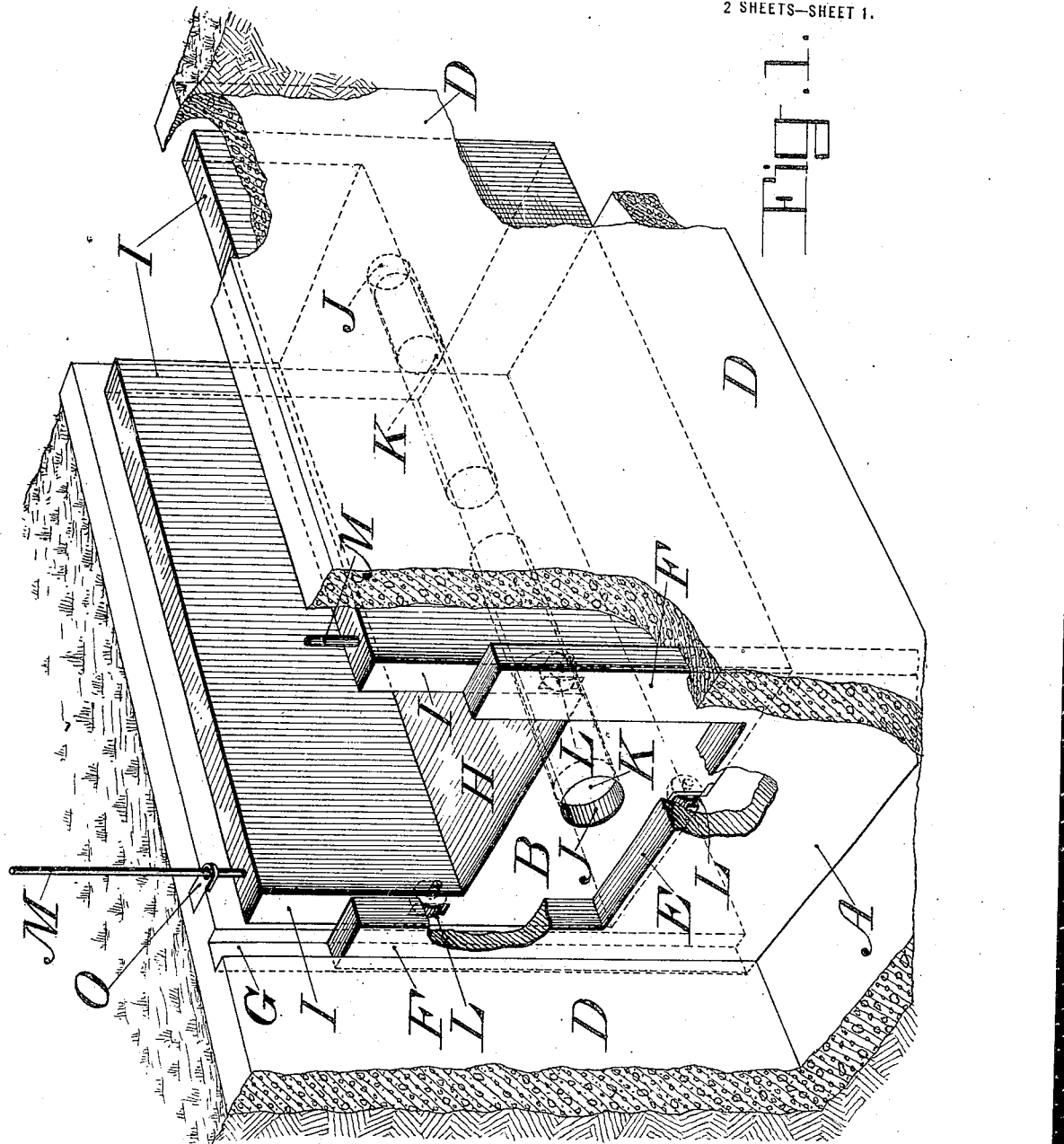

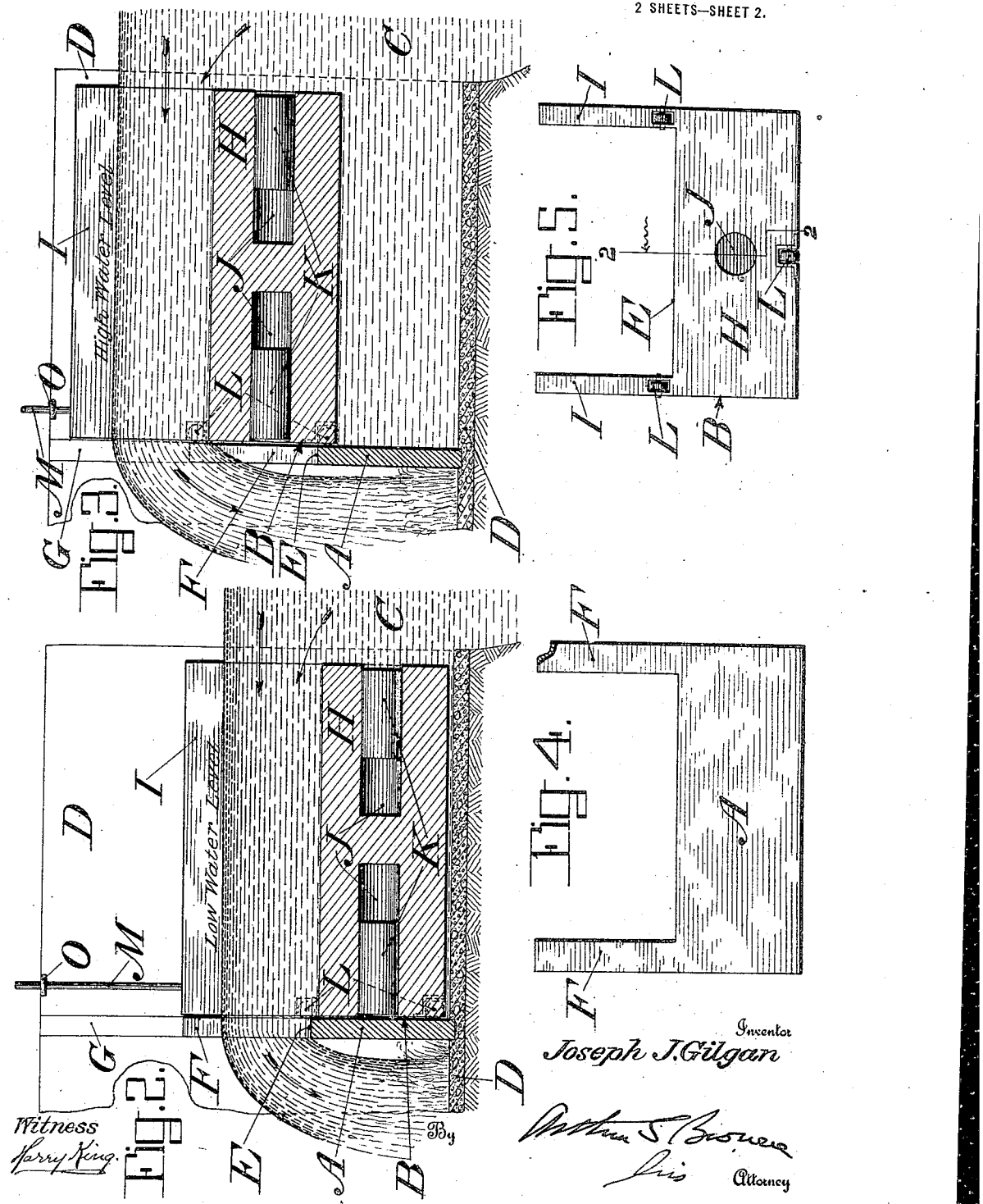

JOSEPH JAMES GILGAN, OF BOISE, IDAHO.

CONSTANT-FLOW WEIR OR MODULE.

1,410,746.　　　　Specification of Letters Patent.　Patented Mar. 28, 1922.

Application filed October 27, 1921. Serial No. 510,735.

*To all whom it may concern:*

Be it known that I, JOSEPH J. GILGAN, of Boise, in the county of Ada and State of Idaho, have invented a new and useful Constant-Flow Weir or Module, of which the following is a specification.

The object of the present invention is to provide a weir or module which will permit a constant predetermined volume of water to flow from the source of water supply and to obtain automatically a constant volume of flow regardless of the rise and fall of the level of the source of supply. This is particularly desirable in the case of an irrigation canal which does not have a constant level or uniform flow and from which it is desired to deliver a uniform flow of water.

This object is achieved by the new weir or module illustrated in the accompanying drawings wherein—

Fig. 1 is a perspective view partly in section of the weir. Fig. 2 is a longitudinal section showing the position which the gate occupies at the low water level. Fig. 3 is a similar section illustrating the position occupied at high water level. Fig. 4 is a front view of the dam. Fig. 5 is a front view of the floating gate.

The new weir or module comprises a dam A, and a floating gate B. The dam is at an outlet from a source of water supply C which may be a ditch, canal, river, pond, or other reservoir of water. The dam may be arranged across an outlet immediately at the border of the reservoir, or it may be arranged across a flume D leading from the reservoir, as shown in the drawings. The dam extends crosswise of the flume and its crown E is at a level intermediate between the top and bottom of the flume. The dam also has two standards F extending upwardly above the crown at the two sides of the flume and extending laterally towards each other from the sides of the flume. As shown in Fig. 1 the sides of the flume have vertical guideways G to receive the dam, and dams of different proportions in height, width and level of crown may be used in accordance with the variation of water level in the reservoir and the volume of water which it is desired to discharge over the dam.

Co-operating with the dam is the floating gate B which is located on the supply side of the dam. The gate comprises a base H and side walls I projecting upwardly from the base at its opposite sides. The two side walls and the upper surface of the base constitute an open ended trough or channel for the flow of water. The gate is constructed of such materials that it will float in water and the drawings indicate the gate as being made of wood. The base of the gate has pockets J into which weights K are placed so as to secure the desired submergence of the gate in the water, and to provide for a predetermined depth of water flowing above the top of the base through the trough.

The down stream end of the gate bears against the dam as indicated in the drawings, the side walls of the gate being alongside the vertical standards of the dam. As shown in the drawings, the width of the trough of the gate between the side walls is equal to the distance between the two standards of the dam, so that the dam permits the discharge of the full volume of water flowing through the gate.

By inserting weights of different sizes or numbers in the gate, the bottom of the gate trough can be maintained at any desired depth below the level of the water in the reservoir. As the water level in the reservoir varies the gate will rise and fall, but always with the bottom of its trough at a definite distance below the water level. so that the flow of water will be always uniform. This is illustrated in Figs. 2 and 3, wherein the water levels are conventionally shown. Fig. 2 shows the low water level, and in this position the gate is close to the bottom of the flume and the bottom of the trough within the gate is level with the crown of the dam. Fig. 3 shows the high water level and the gate is at elevation such that its lowest part is just below the crown of the dam.

The height of the base of the gate should be somewhat greater than the distance between the high and low water levels so as to overlap the crown of the dam at high water, and the height of the crown of the dam above the bottom of the reservoir outlet should at least be equal to the height of the base of the gate. The crown of the dam is below the low water level of the reservoir (whether ditch, canal, or other water supply) and the standards should extend above the crown a distance equal to the height of the gate base.

In order to render the rise and fall of the gate sensitive anti-friction rolls L are interposed between the gate and the dam. As shown in the drawings, the gate is equipped with three such rolls, one near the bottom of the gate mid-way between its sides which bears against the bottom of the dam, and one roll at the bottom of each side wall which abuts against the corresponding standard of the dam.

To maintain the gate in position it may be equipped with vertical guide rods M, each guide rod extending through a stationary guide O. This is particularly desirable in the event that the gate should not be located within a flume, but should be within the body of the reservoir.

Any leakage between the gate and dam will be nearly uniform in all positions of the gate and will be allowed for in weighting the gate.

I claim—

1. A constant flow weir having, in combination, a dam at an outlet from a water supply reservoir with its crown below the low water level of the reservoir; standards at opposite ends of the dam extending upwardly above the crown of the dam; a floating weighted gate having a base with a height equal to the difference between the high and low water levels in the reservoir, and having side walls extending above the sides of the base, said walls and base constituting an open ended trough for the flow of water to and over the dam, said walls registering with the standards of the dam and the said gate base registering with the dam between the standards; anti-friction rolls between the gate and the dam; guide rods on the gate; and stationary guides for the guide rods.

2. A constant flow weir having, in combination, a dam at an outlet from a water supply reservoir with its crown below the low water level of the reservoir; standards at opposite ends of the dam extending upwardly above the crown of the dam; and a floating weighted gate having a base with a height equal to the difference between the high and low water levels in the reservoir, and having side walls extending above the sides of the base, said walls and base constituting an open ended trough for the flow of water to and over the dam, said walls registering with the standards of the dam and the said gate base registering with the dam between the standards.

3. A constant flow weir having, in combination, a dam at an outlet from a water supply reservoir with its crown below the low water level of the reservoir; and a floating weighted gate having a base with a height equal to the difference between the high and low water levels in the reservoir, and having side walls extending above the sides of the base, said walls and base constituting an open ended trough for the flow of water to and over the dam.

4. A constant flow weir having, in combination, a dam at an outlet from a water supply reservoir; and a floating weighted gate having a base and side walls extending above the sides of the base, said walls and base constituting an open ended trough for the flow of water to and over the dam.

5. A constant flow weir having, in combination, a dam at an outlet from a water supply reservoir; a floating weighted gate having a base and side walls extending above the sides of the base, said walls and base constituting an open ended trough for the flow of water to and over the dam; and anti-friction rolls between the gate and the dam.

6. A constant flow weir having, in combination, a dam at an outlet from a water supply reservoir; a floating weighted gate having a base and side walls extending above the sides of the base, said walls and base constituting an open ended trough for the flow of water to and over the dam; guide rods on the gate; and stationary guides for the guide rods.

In witness whereof, I have hereunto signed my name.

JOSEPH JAMES GILGAN.